United States Patent

Haider et al.

Patent Number: 6,063,033
Date of Patent: May 16, 2000

[54] ULTRASOUND IMAGING WITH HIGHER-ORDER NONLINEARITIES

[75] Inventors: Bruno Hans Haider, Ballston Lake; Richard Yung Chiao, Clifton Park, both of N.Y.

[73] Assignee: General Electric Company, Schenectady, N.Y.

[21] Appl. No.: 09/322,748

[22] Filed: May 28, 1999

[51] Int. Cl.[7] .......................................................... A61B 8/00

[52] U.S. Cl. ........................................... 600/447; 600/455

[58] Field of Search ..................................... 600/443, 447, 600/448, 449, 450, 455

[56] References Cited

U.S. PATENT DOCUMENTS

| | | | |
|---|---|---|---|
| 5,577,505 | 11/1996 | Brock-Fisher et al. | 128/662.02 |
| 5,632,277 | 5/1997 | Chapman et al. | 128/660.07 |
| 5,655,536 | 8/1997 | Takamizawa | 600/447 |
| 5,797,847 | 8/1998 | Miller et al. | 600/447 |
| 5,827,188 | 10/1998 | Wright et al. | 600/447 |

OTHER PUBLICATIONS

Averkiou et al., "A New Imaging Technique Based on the Nonlinear Properties of Tissues," 1997 IEEE Ultrasonics Symp., pp. 1561–1566.

*Primary Examiner*—Marvin M. Lateef
*Assistant Examiner*—Maulin Patel
*Attorney, Agent, or Firm*—Marvin Snyder; Douglas E. Stoner

[57] ABSTRACT

In a method and apparatus for ultrasound imaging of biological tissue using higher-order nonlinear signal components an ultrasound line is acquired at different excitation levels. The acquisition is repeated I times with identical beamforming parameters, but varying excitation level. All of the transmitted waveforms are nonlinearly distorted, but the degree of distortion depends on the excitation level, making it possible to extract individual nonlinear signal components by properly combining the received echo signals. A pre-computed estimation matrix, dependent on the order of an estimation model and the excitation levels, is stored in computer memory and used to compute the nonlinear components of interest. The real-time calculations reduce to a linear combination of the received echo signals. A further reduction in computational load can be achieved if one is interested in only the n-th-order nonlinear component.

27 Claims, 3 Drawing Sheets

ULTRASOUND IMAGING WITH HIGHER-ORDER NONLINEARITIES

FIELD OF THE INVENTION

This invention generally relates to ultrasound imaging of the human anatomy for the purpose of medical diagnosis. In particular, the invention relates to methods and apparatus for harmonic imaging.

BACKGROUND OF THE INVENTION

Conventional ultrasound scanners create two-dimensional B-mode images of tissue in which brightness of a pixel is based on the intensity of the echo return. The echo return signals are a combination of fundamental and harmonic signal components, the former being direct echoes of the transmitted pulse and the latter being generated in a nonlinear medium, such as tissue, from finite-amplitude ultrasound propagation.

Until recently, medical ultrasound was considered a linear imaging process. The generation of harmonic signals along the wave propagation path was perceived to be a nuisance. Their effect was limited to creating difficulties for acoustic power measurements and generating an abnormal energy absorption pattern. Recently however, tissue harmonic imaging has received much attention for its ability to provide improved image quality in otherwise difficult imaging situations. Often an image is obscured by clutter which originates from low-amplitude, low-frequency waves bouncing between the transducer and subcutaneous layers. Since these clutter components do not create higher harmonics (at least not to a significant level), they do not appear in images where the fundamental frequency is filtered out.

One known implementation for performing tissue harmonic imaging uses a bandpass filter to separate the second harmonic from the fundamental frequency. Assuming a transmitted signal centered at $f_0$, the receive filter is centered at $2f_0$. This method, while improving the image quality, is accompanied by significant implementation difficulties. Particular care must be taken to design a transmit waveform which does not create significant (linear) signal components in the range of the receive filter. This design requirement can be effectively addressed with multilevel pulsers. The biggest challenge in second harmonic imaging is the bandwidth requirement. Assuming the transmitted signal to have a frequency $f_0$ with bandwidth B (i.e., $f_0 \pm B/2$), a receive filter covering the frequency range $2f_0 \pm B$ is required. Accordingly, the imaging system should provide a passband from $f_0 - B/2$ to $2f_0 + B$. Since most ultrasound transducers are not able to support this bandwidth, significant losses occur. The transmit band is shifted into the lower cutoff region, resulting in a low transmission efficiency. Most of the pulser energy is converted into thermal energy and the achievable acoustic output energy is limited by transducer heating. Similarly, the receive filter is shifted into the upper cutoff region, resulting in a reduced sensitivity. Additionally, the reflected second harmonic echo incurs a higher attenuation due to the frequency-dependent attenuation. These effects combined reduce the sensitivity of second harmonic imaging.

To avoid the problem with transmit energy leaking into the second harmonic, a method of ultrasound imaging has been devised in which two pulses with opposite polarity are transmitted for every ultrasound line and the resulting echo signals are added. The linear signal components cancel out, due to the opposing polarity, whereas the second harmonic signal components are added. In this way the second harmonic and fundamental signal components can be separated without using frequency filters. The bandwidth requirements remain the same, however, since the second harmonic signal components occur in the higher frequency range. Similarly, another method which also uses two transmit pulses sends these transmit pulses with different amplitudes. The echo signals are weighted and subtracted in order to cancel the fundamental signal component.

SUMMARY OF THE INVENTION

Parametric harmonic imaging is performed in a manner which enables different tissue types to be clearly differentiated in diagnostic ultrasound imaging. The method also provides an image having improved signal-to-noise ratio (SNR) and imposes less stringent bandwidth requirements on the imaging system. In accordance with the preferred embodiments, nonlinear signal components higher than the second order are used, preferably the third-order nonlinear signal components. Odd-order nonlinearities create mixing products at the fundamental frequency so that their reception does not require any more bandwidth than conventional (linear) imaging.

In accordance with the preferred embodiments, an ultrasound line is acquired at different levels of the transmit voltage. The acquisition is repeated I times with identical beamforming parameters, but varying excitation level. As used herein, the phrase "excitation level" means excitation amplitude and/or excitation phase. All of the transmitted waveforms are nonlinearly distorted, but the degree of distortion depends on the excitation level. This makes it possible to extract individual nonlinear signal components by properly combining the received echo signals.

In accordance with the preferred embodiments of the invention, a pre-computed estimation matrix is stored in computer memory and used to compute the nonlinear signal components of interest. The pre-computed estimation matrix depends on the order of the estimation model and the excitation levels. The real-time calculations reduce to a linear combination of the received echo signals. A further reduction in computational load can be achieved if one is interested in only the n-th order nonlinear signal component. Then only the n-th row of the estimation matrix need be evaluated.

To generate a single display vector in the ultrasound image, I pulses $p_{i(t), i} = 1, 2, \ldots, I$, with different excitation levels, are transmitted sequentially and the return echo after each transmit is beamformed and stored. For each time t along the beamformed transmit vector, the corresponding data vector $s(t) = [s_1(t), s_2(t), \ldots, s_I(t)]$ is formed and multiplied by the pre-computed estimation matrix to yield the estimated nonlinear response parameters. The estimated parameter for each nonlinearity of interest is then sent to a respective envelope detector.

In the simplest case, the displayed vector is a function of a single estimated nonlinear response parameter, e.g., the third-order nonlinear response parameter. Alternatively, the displayed vector is a function of two or more of the estimated nonlinear response parameters. In accordance with the preferred embodiments of the invention, the estimated nonlinear response parameters are combined for image display by forming the ratio of two nonlinear response parameters, by forming any linear or nonlinear function of two or more estimated nonlinear response parameters, or by weighting the nonlinear response parameters and then using the weighted parameter having a predetermined rank in amplitude. Color images may also be used where different functions of nonlinear response parameters are used to modulate each pixel's color and intensity.

DETAILED DESCRIPTION OF THE PREFERRED EMBODIMENTS

Figure 1:
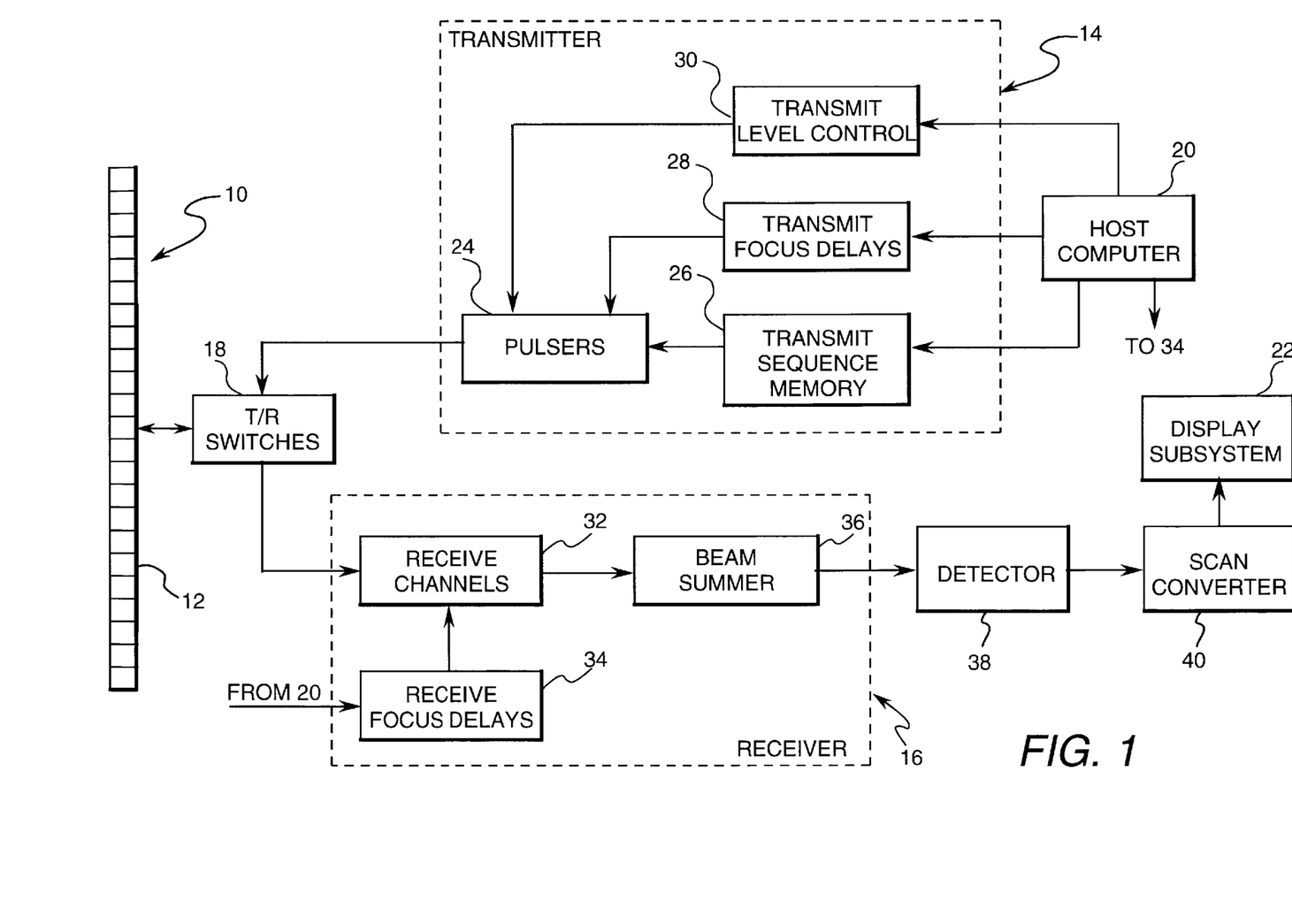
FIG. 1 is a block diagram of a typical digital ultrasound imaging system.

A typical conventional digital real-time ultrasonic imaging system is generally depicted in FIG. 1. This imaging system comprises a transducer array 10 having a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. Transmitter 14 and receiver 16 are operated under control of a host computer 20 responsive to commands by a human operator. Host computer 20 comprises a central processing unit and associated memory. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a monitor of a display subsystem 22.

The base waveform transmitted by each transducer element is determined by a digital transmit sequence stored in a transmit sequence memory 26. Each transducer element 12 in the transmit aperture is pulsed by a pulse waveform produced by a respective bipolar pulser 24 in response to a respective transmit sequence provided to that pulser from transmit sequence memory 26. The +1 and −1 elements of each transmit sequence are transformed into pulses of opposite phase by bipolar pulser 24, while the 0 elements correspond to no pulse. The phase of the excitation pulse waveform is determined by the transmit sequence.

Under the direction of host computer 20, transmitter 14 drives transducer array 10 such that the ultrasonic energy is transmitted as a directed focused beam. To accomplish focusing, respective time delays are imparted to bipolar pulsers 24 by a transmit focus delay subsystem 28, while respective pulse amplitudes are set by a transmit level control subsystem 30. Host computer 20 determines the conditions under which the acoustic pulses will be transmitted. With this information, the transmit focus delay and transmit level control will respectively determine the timing and the amplitude of each of the transmit pulses to be generated by pulsers 24. Pulsers 24 in turn send the transmit pulses to each of elements 12 of transducer array 10 via T/R switches 18. By appropriately adjusting the transmit focus time delays in a conventional manner, an ultrasonic beam can be directed and focused at a transmit focal position. In accordance with a preferred embodiment of the invention, two or more beams are focused at each transmit focal position using the same transmit sequences and the same transmit focus time delays, but different transmit excitation levels.

The echo signals produced by each burst of ultrasonic energy reflect from objects located at successive ranges along each ultrasonic beam. Due to differences in the propagation paths between a reflecting point and each transducer element, the echo signals will not be detected simultaneously and their amplitudes will not be equal. For each transmit, the echo signals from transducer elements 12 are fed to respective receive channels 32 of the receiver. Under the direction of host computer 20, the receiver tracks the direction of the transmitted beam. A subsystem 34 of the receiver imparts the proper receive focus time delays to the received echo signals. The time-delayed receive signals are summed in a receive beam summer 36 for each transmit firing to provide an echo signal which accurately represents the total ultrasonic energy reflected from a point located at a particular range along the ultrasonic beam. The receive channels also have circuitry for filtering the received pulses.

In the conventional system, the beamsummed receive signals may be bandpass filtered and then supplied to a signal processor or detector 38. The bandpass filter (not shown) will pass the desired signal components. Detector 38 converts the bandpass-filtered receive signals to display data. In the B-mode (gray-scale), this is the envelope of the signal, with some additional processing such as edge enhancement and logarithmic compression. A scan converter 40 receives the display data from detector 38 and converts the data into the desired image for display. In particular, scan converter 40 converts the acoustic image data from polar coordinate (R-θ) sector format or Cartesian coordinate linear format to appropriately scaled Cartesian coordinate display pixel data at the video rate. The scan-converted acoustic data are then processed by a video processor incorporated in a display subsystem 22 and produced for display on the display system monitor, which images the time-varying amplitude of the envelope of the signal as a gray scale.

Figure 2:
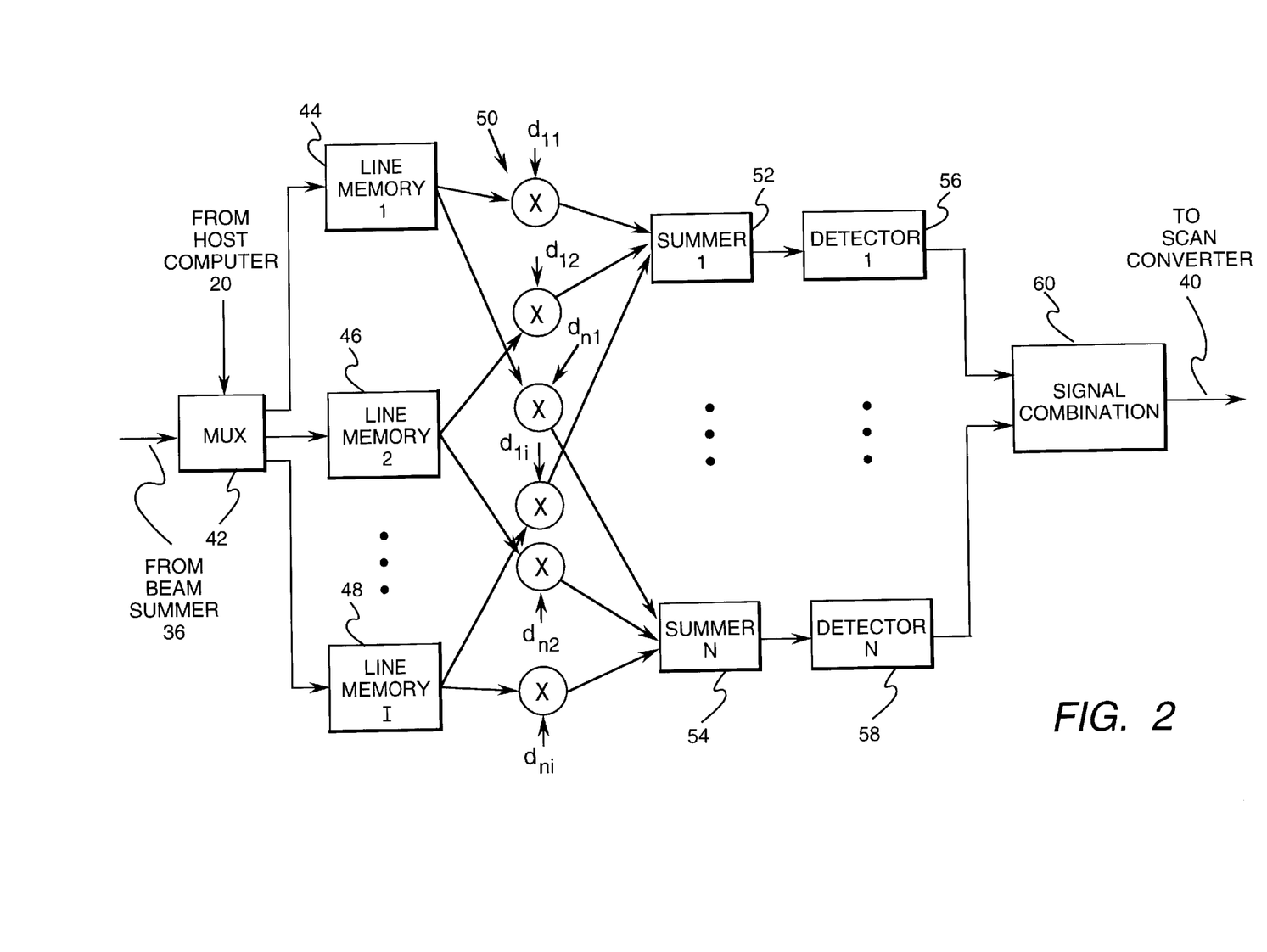
FIG. 2 is a block diagram of a receive signal processing subsystem in accordance with the preferred embodiments of the invention.

In accordance with the preferred embodiments of the invention, detector 38 depicted in FIG. 1 is replaced by a signal processing circuit of the type shown in FIG. 2. In addition, host computer 20 is programmed to control the imaging system components to perform multi-transmit parametric harmonic imaging.

In operation of the preferred embodiments, an ultrasound line is acquired at various excitation levels. The acquisition is repeated I times with identical beamforming parameters but varying excitation levels. All of the transmitted waveforms are nonlinearly distorted, but the degree of distortion depends on the excitation level. The desired nonlinear signal components are then extracted by properly combining the received echo signals.

The pulse distortion can be described by a Taylor series of the form $$f(p) = a_1 p + a_2 p^2 + \ldots + a_n p^n = \sum_{n=1}^{n} a_n p^n \quad (1)$$

where f(p) is the reflected echo signal and p is the transmitted waveform. In the linear regime, all coefficients except $a_1$ would be zero.

In accordance with the preferred embodiments, I transmits are used to estimate N parameters $a_n$, $n = 1, 2, \ldots, N$. The I transmitted pulses are given by $$p_i(t) = b_i p_0(t) \qquad (2)$$

where $i = 1, 2, \ldots, I$; $b_i$ are I unique complex numbers, the amplitude and phase of the $b_i$ respectively defining the amplitude and phase of the excitation waveform; and $p_0(t)$ is the pulse template (i.e., base pulse). The particular shape of $p_0(t)$ is not relevant to the method, while proper selection of the coefficients $b_i$ is necessary for robust operation of the method.

The received echo signals from a point target can be modeled as $$s_i(t) = \sum_{n=1}^{N} a_n b_i^n p_0^n(t) + \varepsilon_i(t) \qquad (3)$$

where $i = 1, 2, \ldots, I$; N is the model order; and $\varepsilon_i(t)$ is noise. The noise term includes thermal noise as well as harmonic response signals not included in Eq. (3), namely $$\sum_{k=M+1}^{\infty} a_k p_0^k.$$

Then Eq. (3) can be written in matrix notation as $$s(t) = \begin{bmatrix} b_1 & b_1^2 & \cdots & b_1^N \\ b_2 & b_2^2 & \cdots & b_2^N \\ \vdots & & \ddots & \vdots \\ b_I & b_I^2 & \cdots & b_{I9}^N \end{bmatrix} \begin{bmatrix} a_1 p_0 \\ a_2 p_0^2 \\ \vdots \\ a_N p_0^N \end{bmatrix} + \varepsilon(t) \qquad (4)$$

$$= B \begin{bmatrix} a_1 p_0 \\ a_2 p_0^2 \\ \vdots \\ a_N p_0^N \end{bmatrix} + \varepsilon(t)$$

B has I rows corresponding to the I excitation levels and N columns indicating the order of the nonlinear model.

In accordance with the preferred embodiment of the invention, the individual components $a_n p_0^n(t)$ are estimated. In general, Eq. (4) may be inverted to yield the unknown quantities $a_n p_0^n(t)$ in terms of the known quantities B and $s(t)$. One way to achieve this is to use the least-squares, minimum-norm formulation. If the estimate of $a_n p_0^n(t)$ is defined as $x_n(t)$, then, if $N > I$, the minimum-norm solution given by $$x(t) = B^T (BB^T)^{-1} s(t) \qquad (5)$$

may be used. Otherwise, the least-squares solution given by $$x(t) = (B^T B)^{-1} B^T s(t) \qquad (6)$$

may be used.

Equations (5) and (6) map the measurements (received echo signals) $s(t)$ to the estimated nonlinear components. Generally at least as many transmits as unknowns ($I \geq N$) are used for more robust estimation. The estimation matrix $-B(BB^T)^{-1}$ in Eq. (5) or $(B^T B)^{-1} B^T$ in Eq. (6)—is pre-computed and stored in computer memory, and depends on the order of the estimation model and the excitation levels. The real-time calculations reduce to a linear combination of the received echo signals $s(t)$. A further reduction in computational load can be achieved if one is interested in only the n-th order nonlinear component. Then only the n-th row need be evaluated.

Of particular interest is the case $N = 3$, i.e., extracting the third-order nonlinearity. The odd-order nonlinearities have the property that one of their mixing products is centered at the transmit center frequency $f_0$. One can select $f_0$ to be in the middle of the transducer transmission band and then receive one of the third-order mixing products, also at $f_0$. Although the bandwidth of this mixing product is three times as wide as the transmitted bandwidth, it can be received much easier than components at multiples of $f_0$ (as in the case of second harmonic imaging).

Due to this characteristic, nonlinear imaging is achieved without need for extremely wide transducer bandwidth. Advantageously, the received signal at $f_0$ does not undergo the increased frequency-dependent attenuation which afflicts second harmonic imaging. Therefore, higher imaging sensitivity can be achieved, along with increased robustness to variations in the transducer cutoff frequencies.

A preferred embodiment of the invention in the form of a signal processing subsystem is generally depicted in FIG. 2. The signal processing subsystem of FIG. 2 can be installed in place of detector 38 in the ultrasound imaging system shown in FIG. 1. The beamsummed receive signal for each transmit is provided to a multiplexer 42, operated under control of the host computer. A first beamsummed receive signal $s_1(t)$ resulting from the first transmit at a first excitation level is switched into a first line memory 44 with multiplexer 42 being set to a first multiplexer state by the host computer. A second beamsummed receive signal $s_2(t)$ resulting from the second transmit at a second excitation level is switched into a second line memory 46 with multiplexer 42 being set to a second multiplexer state by the host computer. This is repeated for each of I transmits, with the I-th beamsummed receive signal $s_I(t)$ being stored in an I-th line memory 48. The excitation level of the pulse waveform is varied from transmit to transmit, with no two transmits both having the same excitation level. After all of the I receive signals $s_1(t)$ through $s_I(t)$ have been acquired and stored, they are multiplied by the pre-computed estimation matrix, the weighting factors of the estimation matrix being designated by the letter $d_{ni}$ in FIG. 2, wherein the subscript n indicates the row in the matrix and the subscript i indicates the column in the matrix. The weighting factors $d_{ni}$ are stored in computer memory and supplied by the host computer to a bank of multipliers 50. Each receive signal is multiplied by the weighting factors of a respective row in the estimation matrix to form N products, which are then sent to respective summers. For the sake of simplicity, FIG. 2 shows only the first summer 52 and the N-th summer 54. Each summer sums a set of I products. For example, where $i = 3$ and $n = 2$, summer 52 produces the sum $d_{11} s_1(t) + d_{12} s_2(t) + d_{13} s_3(t)$, while summer 54 produces the sum $d_{21} s_1(t) + d_{22} s_2(t) + d_{23} s_3(t)$. The output signal of each summer is sent to a respective detector (e.g., an envelope detector). For the sake of simplicity, FIG. 2 shows only the first detector 56 and the N-th detector 58. In accordance with the preferred embodiments of the estimation matrix, each detector will produce a respective detected signal, a substantial part of each detected signal comprising a respective nonlinear signal component. If only one nonlinear signal component (e.g., the third-order non-linearity) is to be used for imaging, then only one detector is needed. If two or more nonlinear signal components are to be combined, then an equal number of detectors are needed. In the former instance, the detector output signal is sent directly to the scan converter. In the latter instance, the detector output signals are combined in a signal combination circuit 60 and then scan-converted, video processed and displayed in conventional manner.

Figure 3:
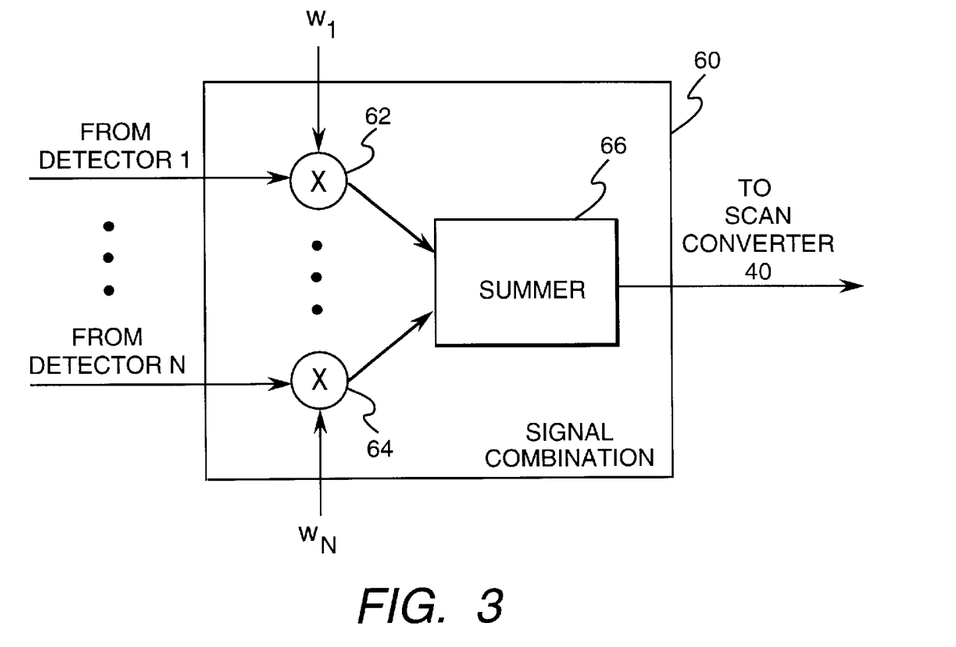
FIG. 3 is a block diagram of a signal combining circuit in accordance with one preferred embodiment of the invention.

In accordance with one preferred embodiment of the invention shown in FIG. 3, the signal combination circuit comprises a bank of N multipliers, each multiplier receiving the output signal of a respective one of the N detectors and a respective weighting factor $w_n$ supplied by the host computer. Again for the sake of simplicity, only the first multiplier 62 and the N-th multiplier 64 are shown in the drawing. The respective products of the multipliers are summed by a summer 66 and the summer output signal is sent to the scan converter. It should be appreciated that the weighting factors $d_{ni}$ of the estimation matrix and the weighting factors $w_n$ applied by signal combination circuit 60 are selected to achieve higher-order nonlinear imaging, i.e., using at least one nonlinear signal component of order 3 or greater.

Figure 4:
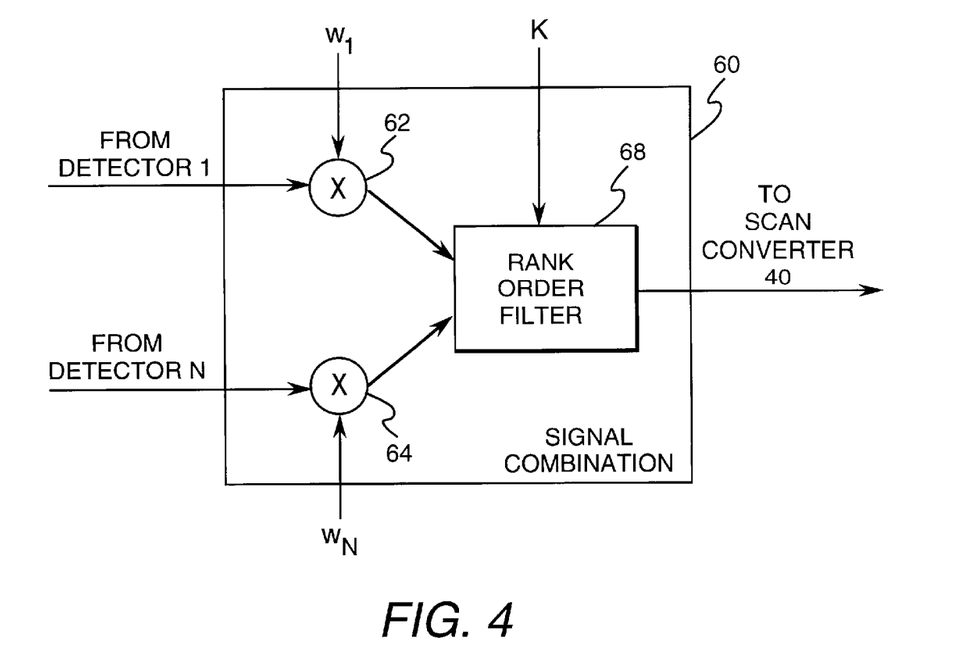
FIG. 4 is a block diagram of a signal combining circuit in accordance with another preferred embodiment of the invention.

A further preferred embodiment of the signal combination circuit is depicted in FIG. 4. In this embodiment, the multiplier output signals are provided to a rank order filter 68, which passes at any given moment only the multiplier output signal having an amplitude of rank K, the value of K being supplied to rank order filter 68 by the host computer. For example, if K=1, then the multiplier output signal of greatest amplitude at any given moment will be passed to the scan converter. Thus a given line in the display image may comprise receive vector segments based on signal components of different order, e.g., linear and third-order nonlinear signal components or second-order and third-order nonlinear signal components. Rank order filtering can be used to reduce speckle. Alternatively, K may be selected to pass at any given moment the multiplier output signal having a median amplitude, i.e., K>1. The signal of median amplitude may be taken in situations where taking the signal of maximum amplitude should be avoided, e.g., when the maximum-amplitude signal might be the result of a signal component error or interference.

Although not shown in the drawings, it should be appreciated that a signal combination circuit may also be designed to form the ratio of the N multiplier output signals produced within the signal combination circuit by using a ratioing circuit instead of summer 66 or rank order filter 68.

The parametric harmonic imaging technique disclosed herein can be applied to radiofrequency signals or to baseband signals. In the latter instance, the radiofrequency signals produced by the receive beamformer are demodulated into in-phase and quadrature (I/Q) signal components by a demodulator. The I/Q signal components produced by the demodulator are then supplied to respective processing subsystems of the type depicted in FIG. 2.

The disclosed method of operation is applicable to medical ultrasonic imaging, providing improved image quality and reduced clutter disturbance as compared to conventional (linear) imaging. The implementation requires significantly less system bandwidth than previously proposed systems. This can result in a cost reduction and a more robust operation of the imaging method. Importantly, the invention entirely avoids the design trade-offs that must be made with prior art approaches, so that other aspects of the ultrasound system (e.g., Doppler sensitivity) are not compromised.

While only certain preferred features of the invention have been illustrated and described, many modifications and changes will occur to those skilled in the art. For example, the method of the invention encompasses transmitting (I+1) firings wherein none of the first through I-th transmit firings have the same excitation level, but the (I+1)-th transmit firing has the same excitation level as that of one of the first through I-th transmit firings. It is, therefore, to be understood that the appended claims are intended to cover all such modifications and changes as fall within the true spirit of the invention.

What is claimed is:

1. A method for imaging matter comprising the steps of:
    transmitting wave energy during first through I-th transmit firings focused at a transmit focal position, where I>1, none of said first through I-th transmit firings having the same excitation level;
    transducing wave energy transmitted in said first through I-th transmit firings and returned from said matter to form first through I-th sets of receive signals respectively;
    beamforming said first through I-th sets of receive signals to form first through I-th receive vectors respectively comprising acoustic data acquired along a receive scan line;
    applying first through I-th estimation weighting factors to said first through I-th receive vectors respectively to form first through I-th weighted receive vectors respectively, said first through I-th estimation weighting factors being selected to emphasize a first signal component when said first through I-th weighted receive vectors are summed, said first signal component being a nonlinear signal component of order three or greater;
    summing said first through I-th weighted receive vectors to form a first summed receive vector comprising said first signal component;
    processing said first summed receive vector to form image display data as a function of said first summed receive vector; and
    displaying said image display data.

2. The method as recited in claim 1, wherein said processing step comprises the step of detecting said first summed receive vector.

3. The method as recited in claim 1, further comprising the steps of:
    applying (I+1)-th through 2I-th estimation weighting factors to said first through I-th receive vectors respectively to form (I+1)-th through 2I-th weighted receive vectors respectively, said (I+1)-th through 2I-th estimation weighting factors being selected to emphasize a second signal component when said (I+1)-th through 2I-th weighted receive vectors are summed, said second signal component having an order different than the order of said first signal component; and
    summing said (I+1)-th through 2I-th weighted receive vectors to form a second summed receive vector comprising said second signal component,
    wherein the processing step comprises the steps of:
    detecting said first and second summed receive vectors to form first and second detected receive signals respectively; and
    combining at least said first and second detected receive signals to form a combined receive signal,
    wherein said image display data are a function of said combined receive signal.

4. The method as recited in claim 3, wherein the combining step comprises the steps of:
    applying first and second signal combination weighting factors to said first and second detected receive signals respectively to form first and second weighted receive signals; and
    summing said first and second weighted receive signals.

5. The method as recited in claim 3, wherein the combining step comprises the steps of:
applying first and second signal combination weighting factors to said first and second detected receive signals respectively to form first and second weighted receive signals; and
ratioing said first and second weighted receive signals to form said combined receive signal.

6. The method as recited in claim 3, wherein the combining step comprises the steps of:
applying first and second signal combination weighting factors to said first and second detected receive signals respectively to form first and second weighted receive signals; and
rank order filtering said first and second weighted receive signals to form said combined receive signal.

7. The method as recited in claim 1, wherein said wave energy comprises ultrasound energy.

8. An imaging system comprising:
a transducer array including a multiplicity of transducer elements for transmitting wave energy in response to electrical activation and transducing returned wave energy into electrical signals;
a transmitter coupled to said transducer array and programmed to activate a plurality of said transducer elements to transmit wave energy during first through I-th transmit firings focused at a transmit focal position, where I>1, none of said first through I-th transmit firings having the same excitation level;
a receiver programmed to beamform first through I-th sets of receive signals output by said transducer array following said first through I-th transmit firings respectively to form first through I-th receive vectors comprising acoustic data acquired along a receive scan line;
weighting means for applying first through I-th estimation weighting factors to said first through I-th receive vectors respectively to form first through I-th weighted receive vectors respectively, said first through I-th weighting factors being selected to emphasize a first signal component when said first through I-th weighted receive vectors are summed, said first signal component being a nonlinear signal component of order three or greater;
a first summer for summing said first through I-th weighted receive vectors to form a first summed receive vector comprising said first signal component;
a processing subsystem for processing said first summed receive vector to form image display data as a function of said first summed receive vector; and
a display subsystem for displaying said display image data.

9. The system as recited in claim 8, wherein said processing subsystem comprises a detector for detecting said first summed receive vector.

10. The system as recited in claim 8, further comprising:
weighting means for applying (I+1)-th through 2I-th estimation weighting factors to said first through I-th receive vectors respectively to form (I+1)-th through 2I-th weighted receive vectors respectively, said (I+1)-th through 2I-th estimation weighting factors being selected to emphasize a second signal component when said (I+1)-th through 2I-th weighted receive vectors are summed, said second signal component having an order different than the order of said first signal component; and
a second summer for summing said (I+1)-th through 2I-th weighted receive vectors to form a second summed receive vector comprising said second signal component,
wherein said processing subsystem comprises:
detectors for detecting said first and second summed receive vectors to form first and second detected receive signals respectively; and
a signal combiner for combining at least said first and second detected receive signals to form a combined receive signal,
wherein said image display data are a function of said combined receive signal.

11. The system as recited in claim 10, wherein said signal combiner comprises:
weighting means for applying first and second signal combination weighting factors to said first and second detected receive signals respectively to form first and second weighted receive signals; and
a third summer for summing said first and second weighted receive signals.

12. The system as recited in claim 10, wherein said signal combiner comprises:
weighting means for applying first and second signal combination weighting factors to said first and second detected receive signals respectively to form first and second weighted receive signals; and
a ratioing circuit for ratioing said first and second weighted receive signals to form said combined receive signal.

13. The system as recited in claim 10, wherein said signal combiner comprises:
weighting means for applying first and second signal combination weighting factors to said first and second detected receive signals respectively to form first and second weighted receive signals; and
a rank order filter for rank order filtering said first and second weighted receive signals to form said combined receive signal.

14. An imaging system comprising:
a transducer array including a multiplicity of transducer elements for transmitting wave energy in response to electrical activation and transducing returned wave energy into electrical signals;
a display monitor for displaying display image data; and
a computer programmed to perform the steps of:
activating transducer elements of said array to transmit wave energy during first through I-th transmit firings focused at a transmit focal position, where I>1, none of said first through I-th transmit firings having the same excitation level;
beamforming first through I-th sets of receive signals produced by said transducer array following said first through I-th transmit firings to form first through I-th receive vectors respectively comprising acoustic data acquired along a receive scan line;
applying first through I-th estimation weighting factors to said first through I-th receive vectors respectively to form first through I-th weighted receive vectors respectively, said first through I-th estimation weighting factors being selected to emphasize a first signal component when said first through I-th weighted receive vectors are summed, said first signal component being a nonlinear signal component of order three or greater; summing said first through I-th weighted receive vectors to form a first summed receive vector comprising said first signal component;

processing said first summed receive vector to form image display data which are a function of said first summed receive vector; and sending said image display data to said display monitor.

15. The system as recited in claim 14, wherein said computer is further programmed to perform the steps of:

applying (I+1)-th through 2I-th estimation weighting factors to said first through I-th receive vectors respectively to form (I+1)-th through 2I-th weighted receive vectors respectively, said (I+1)-th through 2I-th estimation weighting factors being selected to emphasize a second signal component when said (I+1)-th through 2I-th weighted receive vectors are summed, said second signal component having an order different than the order of said first signal component; and summing said (I+1)-th through 2I-th weighted receive vectors to form a second summed receive vector comprising said second signal component, and wherein the processing step comprises the steps of:

detecting said first and second summed receive vectors to form first and second detected receive signals respectively; and combining at least said first and second detected receive signals to form a combined receive signal, wherein said image display data are a function of said combined receive signal.

16. The system as recited in claim 15, wherein the combining step comprises the steps of:

applying first and second signal combination weighting factors to said first and second detected receive signals respectively to form first and second weighted receive signals; and summing said first and second weighted receive signals.

17. The system as recited in claim 15, wherein the combining step comprises the steps of:

applying first and second signal combination weighting factors to said first and second detected receive signals respectively to form first and second weighted receive signals; and ratioing said first and second weighted receive signals to form said combined receive signal.

18. The system as recited in claim 15, wherein the combining step comprises the steps of:

applying first and second signal combination weighting factors to said first and second detected receive signals respectively to form first and second weighted receive signals; and rank order filtering said first and second weighted receive signals to form said combined receive signal.

19. An imaging system comprising:

a transducer array including a multiplicity of transducer elements for transmitting wave energy in response to electrical activation and transducing returned wave energy into electrical signals;

a display monitor for displaying display image data; and a computer programmed to perform the steps of:

activating transducer elements of said array to transmit wave energy during first through I-th transmit firings focused at a transmit focal position, where I>1, none of said first through I-th transmit firings having the same excitation level;

beamforming first through I-th sets of receive signals produced by said transducer array following said first through I-th transmit firings to form first through I-th receive vectors respectively comprising acoustic data acquired along a receive scan line;

applying an estimation matrix transformation to said first through I-th receive vectors to form an estimated receive signal, said estimation matrix transformation comprising a set of weighting factors selected to emphasize a nonlinear signal component in said estimated receive signal, said nonlinear signal component having an order of three or greater;

processing said estimated receive signal to form image display data as a function of said estimated receive vector; and sending said image display data to said display monitor.

20. The system as recited in claim 19, wherein said estimation matrix transformation is derived from a minimum-norm solution given by $x(t)=B^T(BB^T)^{-1}s(t)$.

21. The system as recited in claim 19, wherein said estimation matrix transformation is derived from a least-squares solution given by $x(t)=(B^TB)^{-1}B^Ts(t)$.

22. An imaging system comprising:

a transducer array including a multiplicity of transducer elements for transmitting wave energy in response to electrical activation and transducing returned wave energy into electrical signals;

a display monitor for displaying display image data; and a computer programmed to perform the steps of:

activating transducer elements of said array to transmit wave energy during first through I-th transmit firings focused at a transmit focal position, where I>1, none of said first through I-th transmit firings having the same excitation level;

beamforming first through I-th sets of receive signals produced by said transducer array following said first through I-th transmit firings to form first through I-th receive vectors respectively comprising acoustic data acquired along a receive scan line;

applying an estimation matrix transformation to said first through I-th receive vectors to form first through N-th estimated receive signals, N>1, said estimation matrix transformation comprising a set of weighting factors selected to emphasize first through N-th signal components in said first through N-th estimated receive signals respectively, wherein at least one of said first through N-th signal components is a nonlinear signal component of order three or greater;

detecting said first through N-th estimated receive signals to form first through N-th detected receive signals;

combining said first through N-th detected receive signals to form a combined receive signal;

processing said combined receive signal to form image display data as a function of said combined receive vector; and sending said image display data to said display monitor.

23. The system as recited in claim 22, wherein said estimation matrix transformation is derived from a minimum-norm solution given by $$x(t)=B^T(BB^T)^{-1}s(t).$$

24. The system as recited in claim 22, wherein said estimation matrix transformation is derived from a least-squares solution given by $$x(t)=(B^TB)^{-1}B^Ts(t).$$

25. The system as recited in claim 22, wherein the combining step comprises the steps of:
applying first through N-th signal combination weighting factors to said first through N-th detected receive signals respectively to form first through N-th weighted receive signals; and
summing said first through N-th weighted receive signals.

26. The system as recited in claim 22, wherein the combining step comprises the steps of:
applying first through N-th signal combination weighting factors to said first through N-th detected receive signals respectively to form first through N-th weighted receive signals; and
ratioing a pair of said first through N-th weighted receive signals to form said combined receive signal.

27. The system as recited in claim 22, wherein the combining step comprises the steps of:
applying first through N-th signal combination weighting factors to said first through N-th detected receive signals respectively to form first through N-th weighted receive signals; and
rank order filtering said first through N-th weighted receive signals to form said combined receive signal.

* * * * *